Sept. 13, 1960  C. L. PALMER ET AL  2,952,185
EASEL AND HORIZONTAL PROJECTOR PHOTOGRAPHIC APPARATUS
Filed Sept. 21, 1956  2 Sheets-Sheet 1

INVENTORS.
CHARLES L. PALMER
CHARLES P. MILLS, JR.
BY Arthur H. Seidel
ATTORNEY.

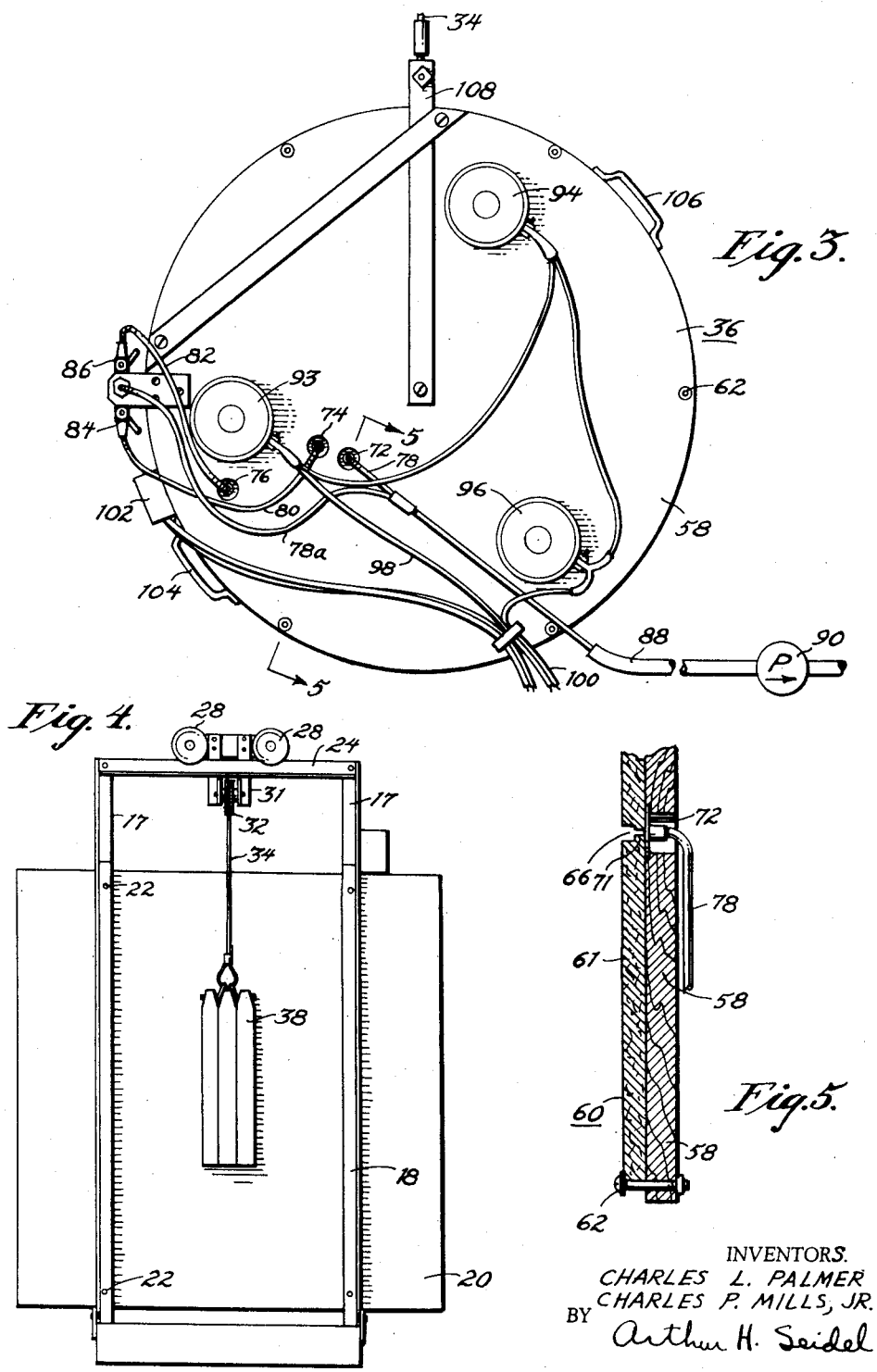

United States Patent Office 2,952,185
Patented Sept. 13, 1960

2,952,185

EASEL AND HORIZONTAL PROJECTOR PHOTOGRAPHIC APPARATUS

Charles L. Palmer, Drexel Hill, and Charles P. Mills, Jr., Haddonfield, Pa.
(708 S. Washington Square, Philadelphia 6, Pa.)

Filed Sept. 21, 1956, Ser. No. 611,257

7 Claims. (Cl. 88—24)

The present invention relates to a horizontal projector and to an easel therefor, and more particularly, to a horizontal projector having an easel whose position may be readily and easily varied to meet differing space requirements, and which easel will hold a definite position for maintaining registration with the lens of the projector, once the position of such easel has been established, such position being rigorously maintained until the easel is released therefrom; and to an easel having the aforesaid characteristics.

A limiting variable to the size of horizontal photographic projectors (by which is meant to include both horizontal cameras and enlargers) has been the requirement that the position of the easel holding the object being photographed, or the enlarging paper, in the case of an enlargement, must be varied for each photograph or enlargement. Complex mechanisms have been constructed to handle the positioning of large easels which are spaced an appreciable distance from the lens portion of the projector. For example, such prior mechanisms have included a plurality of lead screws which are rotated by hand wheels in order to properly position the easel before the lens. Since the easel must be moved along paths which are angularly or curvilinearly situated in respect to the horizontal, the positioning of large easels by the use of lead screws has proven to be very difficult.

The use of attaching means such as a plurality of small magnets which hold a photographic sheet against a wall comprising a magnetic metal has been suggested, but has proven to be unsatisfactory. Thus, it is not feasible to evenly flatten photographic papers by the use of a plurality of discrete magnetic retention means.

The subject invention has special utility for use in the preparation of halftones to be used for offset lithography, particularly for the preparation of color photographs where the halftones are prepared through contact with a contact screen. The preparation of color photographs for periodicals and books by the halftone process may require three or more exposures on a single sheet of film for a single color. A movement of the sheet of film out of registration of as little as one hundredth of an inch or less between exposures will result in an inferior product. With contact screens where highlights are to be accentuated, exposures without the screen are frequently necessary. Furthermore, for different colors the contact screen must be positioned at different angles. All of the foregoing must be accomplished with precise registration, if a useful product is to be obtained.

The present invention has as an object the provision of photographic apparatus comprising a vertically mounted easel juxtaposed to a horizontal projector in which the easel may be readily moved along both rectilinear and curvilinear paths by the application of but a single hand of the user, and selectively clamped firmly in its intended position, which position may be maintained in register until volitionally released.

The present invention has as another object the provision of a photographic apparatus including a horizontal projector and a juxtaposed vacuum holder type easel in which photographic material carried by the retention portion of the juxtaposed vacuum holder type easel is held flatly and firmly.

The present invention has as yet another object the provision of a photographic easel upon which photographic materials may be carried and which may be readily positioned in virtually an infinite variety of different positions.

The present invention has as a still further object the provision of a photographic easel upon which a contact screen may be superimposed over a sheet of film and the contact screen rotated angularly, with the film sheet at all times remaining in registration.

Other objects will appear hereinafter.

For the purpose of illustrating the invention there is shown in the drawings a form which is presently preferred; it being understood, however, that this invention is not limited to the precise arrangements and instrumentalities shown.

Figure 3 is a rear elevational view taken on line 3—3 of Figure 1 of the vacuum carrier portion of the easel of the present invention.

Figure 4 is a rear elevational view of the easel of the present invention taken on line 4—4 of Figure 1.

Figure 5 is a section taken on line 5—5 of Figure 3.

Figure 1:
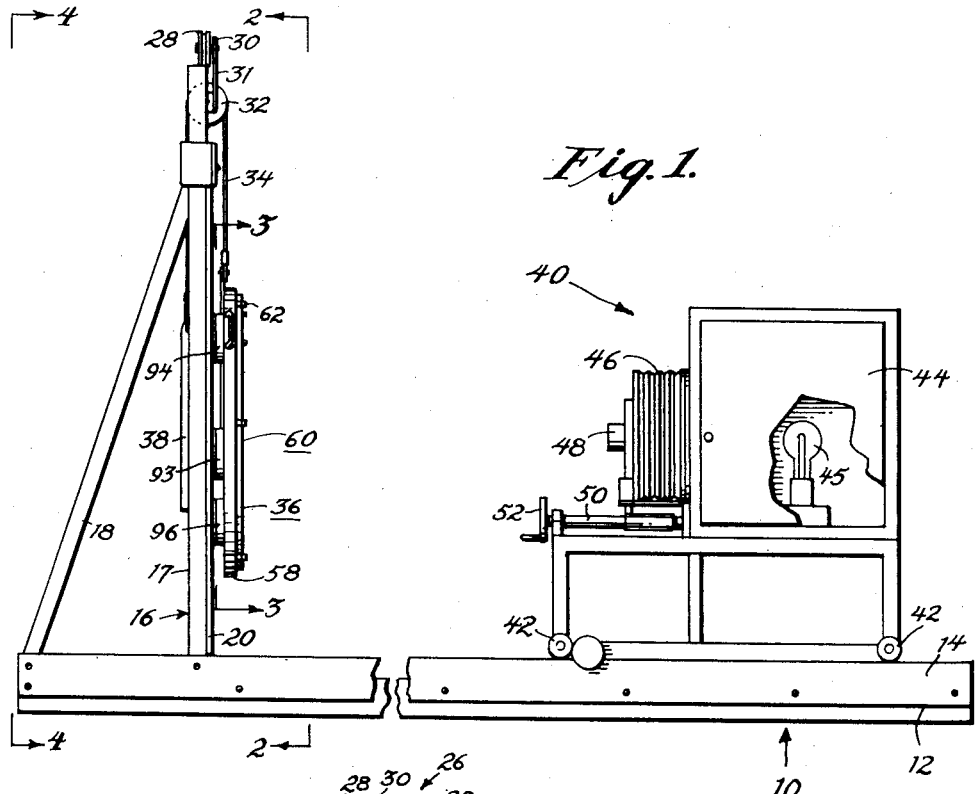
Figure 1 is a side elevational view of the photographic apparatus of the present invention.
Figure 2:
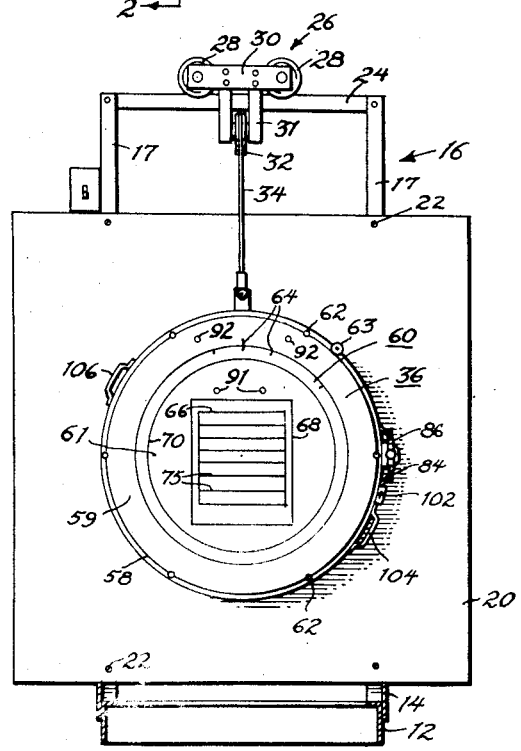
Figure 2 is a front elevational view of the easel of the present invention taken on line 2—2 of Figure 1.

The photographic apparatus of the present invention comprising a projector is designated by the numeral 10 and comprises a base 12 on which is mounted a horizontal track 14. Near one end of horizontal track 14 is positioned the upright easel portion 16 of the present invention comprising a pair of spaced uprights 17 formed of angle irons or the like fixedly secured to track 14. The uprights 17 of easel 16 are braced in vertical disposition by means of braces 18 which are fixedly secured to track 14. A large plate 20 formed of steel or other magnetic metallic material is vertically mounted against the uprights 17 and is fixedly secured thereto by means of fastening elements 22, which may comprise bolts, rivets or the like.

A horizontal crossbar 24 joins the upper ends of uprights 17 and is positioned somewhat above the upper edge of plate 20. A carrier 26 comprising a pair of tandem pulleys 28 is carried on crossbar 24, with the connecting bar 30 between the tandem pulleys 28 supporting a depending clevis 31 on which is carried a suspension pulley 32.

A cable 34 is carried on suspension pulley 32 and carries at its ends the vacuum carrier portion of the easel designated generally by the numeral 36 juxtaposed to the inner face of plate 20 and the counter-weight 38 juxtaposed to the outer face of plate 20.

The horizontal projector portion of the photographic apparatus of the present invention is of conventional construction and is designated as 40. Projector portion 40 is movably supported by wheels 42 on track 14. Projector portion 40 in the illustrated embodiment comprises an enlarger array, although it will be readily understood by those having skill in the photographic arts that projector portion 40 may also comprise a camera. In the illustrated embodiment, projector portion 40 comprises a posterior box 44 within which may be mounted illumination means 45 and an exposed negative retained within a holder (not shown).

Expansible bellows 46 carrying a lens 48 are mounted upon tubular guides 50 which project from box 44. A focusing wheel 52 which is coupled to bellows 46 by a conventional lead screw and nut engagement or the like may be used to advance or retreat lens 48, expanding or contracting bellows 46.

A conventional switching mechanism for controlling the illumination means within box 44, and conventional timing means, such as an electrical timer, may be provided for controlling the time period of exposure. For the sake of clarity such switching means and timer have been omitted from the drawings.

The vacuum carrier portion 36 of easel 16 comprises a circular disc 58 which may be formed of plywood or the like and which in the illustrated embodiment has a diameter appreciably smaller than the height or width dimensions of plate 20. It is preferred that, as illustrated, the disc 58 be circular, in order to provide for rotation of the contact screen holder annulus 59 as will be more fully explained below.

The vacuum holder which is designated generally by the numeral 60 may be formed from a variety of materials such as metal, plastic, fibrous materials or the like. In the illustrated embodiment the vacuum holder 60 is formed from masonite and comprises an inner film sheet holder portion 61 and an outer contact screen holder portion 59 comprising an annulus which may be rotated in respect to inner portion 61. The inner portion 61 may be fixedly secured to the circular disc 58. The contact screen holder 59 is rotatably mounted about inner portion 61, being held in position by means of a peripheral ring of posts 62. A friction lock 63 of conventional design may be used to fixedly secure portion 59 in any predetermined position. Indicia designated at 64 may be provided to permit accurate rotational adjustment of portion 59 in respect to portion 61, as at angles of 15 degrees or 45 degrees on either side of the vertical.

A series of three vacuum tracks, namely inner rectangular track 66, outer rectangular track 68, and outer circular track 70 are provided on vacuum holder 60. Each of the tracks comprises a continuous endless groove. As seen particularly in Figure 5 wherein track 66 is shown in section, the groove of the track is connected through a passageway, such as passageway 71, to a tube or conduit, preferably formed of copper tubing or the like which extends ultimately to the vacuum pump schematically designated as 90.

Referring now specifically to Figures 3 and 5, it will be seen that the disc 58 is perforated to provide apertures 72, 74 and 76 through which extend conduits 78, 80 and 82 which are joined to respective tracks 66, 68 and 70. In the illustrated embodiment, conduit 78 is bifurcated, so that in addition to the portion of it which extends through aperture 72, it also comprises a portion 78a which is manifolded to form conduits 80 and 82. A valve 84 may be provided in conduit 80 and a valve 86 may be provided in conduit 82.

A flexible conduit 88, such as a rubber hose, is fitted over conduit 78. Flexible conduit 88 may be joined to the vacuum pump 90 or other means for continuously exhausting the tracks 66, 68 and 70.

A pair of pins 91 are provided on inner portion 61 and are so positioned that when sheets of film of standard size provided with spaced mating notches are mounted thereon, such sheets of film will be juxtaposed to either track 66 in the case of relatively small size sheets of film or to tracks 66 and 68 in the case of relatively large size sheets of film. Pins 92 are provided on contact screen holder annulus 59 for mounting a half-tone contact screen over film carried by pins 91. The circular track 70 is utilized to retain the contact screen in juxtaposed position to the sheet of film retained on pins 91. The surface of the inner portion 61 may be roughened by the series of spaced parallel grooves 75 to facilitate the removal of air bubbles and the like from beneath the surface of the film or contact screen when the same are juxtaposed to vacuum holder 60.

A plurality of electromagnets, with three electromagnets 93, 94 and 96 arranged at the corners of an equilateral triangle being shown in the illustrated embodiment, are imbedded and fixedly secured to the rear face of disc 58 and project outwardly therefrom. The outer faces of electromagnets 93, 94 and 96 fall in the same plane so that when electromagnets 93, 94 and 96 are positively engaged with the juxtaposed face of plate 20, the outer surface of vacuum holder 60 is parallel to the face of plate 20 and is vertically disposed.

Wires 98 and 100 connect electromagnets 92, 94 and 96 together. A switch 102 is fixedly secured to the edge of disc 58 proximate valves 84 and 86, and may be used to control the flow of current into electromagnets 93, 94 and 96.

A pair of handles 104 and 106 are oppositely positioned on the edge of disc 58 and provide grasping means whereby disc 58 may be readily moved laterally.

Cable 34 is secured to anchorage bar 108 which is fixedly secured to the rear face of disc 58.

The operation of the device of the present invention is as follows:

The camera 40 may be moved closer and further from easel 16 by rolling it on its wheels 42. When the camera 40 has attained its correct position, precise focusing can be achieved by means of focusing wheel 52 which expands or contracts expansible bellows 46.

The raising or lowering or sidewise movements of vacuum carrier portion 36 can be accomplished by first opening switch 102 cutting off the flow of electrical current to electromagnets 93, 94 and 96. Such electromagnets 93, 94 and 96 will then become disengaged from plate 20 permitting the vacuum carrier portion 36 to be readily manipulated by grasping one of the handles 104 or 106 and moving vacuum carrier portion 36 which is counterweightedly suspended on cable 34 either laterally or upwardly; the upward or downward movement of vacuum carrier portion 36 being easily accomplished due to counterweights 38. For pronounced sidewards movement of easel 36, tandem pulleys 28 may be moved on crossbar 24.

In operation, track 66 is always under vacuum. This track is intended to retain a relatively small size film sheet, which is aligned on pins 91, on the vacuum holder 60. When relatively large size film sheets are retained on vacuum holder 60 the valve 84 is opened, subjecting track 68 to vacuum. When a contact screen is to be juxtaposed over the film sheet, it is mounted on pins 92, and then the valve 86 is opened, subjecting track 70 to vacuum and flattening out the contact screen. Rotation of the contact screen to any desired angle may be accomplished by loosening friction lock 63, rotating the contact screen holder portion 59 to the desired angle, which may be directly observed through indicia 64, and then locking the friction lock 63. Such rotation is, of course, for security purposes usually done without the contact screen being mounted on pins 92. The facile rotation of the contact screen in the manner above-indicated permits color printing to be easily achieved, as a different angle for the pattern of the contact screen may be utilized depending on the color that is desired.

The subject invention permits rapid and precise alignment of lens 48 with the juxtaposed face of vacuum carrier portion 36 of the easel 16. Moreover, the facile manipulation of the largest size vacuum carrier portions may be accomplished even with large size photographic apparatus requiring massive easels. It is therefore possible for photographic apparatus comprising a horizontal camera of substantially the largest practical size to be used with an easel, permitting direct enlargements to be made of the largest practical size.

The present invention may be embodied in other specific forms without departing from the spirit or essential attributes thereof and, accordingly, reference should be made to the appended claims, rather than to the foregoing specification as indicating the scope of the invention.

In the following claims "camera box" is to be construed as meaning both a projector and means for making a photograph.

We claim:
1. A vertical easel for selectively mounting objects comprising an upright frame, a plate carried on said frame, said plate being formed of magnetic metal and having a vertical generally planar face, an object holder dependent suspended from a cable and carried juxtaposed to the generally planar face of said plate, at least one electromagnet fixedly secured on the rear face of said object holder, a switch means for interrupting the flow of current to said electromagnet, and retention means for retaining an object on the face of said object holder opposite said rear face, said retention means including a pair of concentric circular disks, the outer one of which is rotatable in respect to the inner of said disks, a plurality of grooves on the face of the inner of said disks, and means for producing a vacuum in communication with said grooves.

2. An easel in accordance with claim 1, in which retention pins spaced from the grooves are provided on the inner disk, retention pins are provided on the outer disk, and valve means are provided intermediate the means for producing the vacuum and at least one of said grooves for selectively isolating said groove from said vacuum producing means, with said valve means being fixedly secured to said object holder.

3. A vertical easel for selectively mounting objects comprising an upright frame, a plate carried on said frame, said plate being formed of magnetic metal and having a vertical generally planar face, an object holder dependently suspended from a cable and carried juxtaposed to the planar face of said plate, at least one electromagnet fixedly secured on the rear face of said object holder, a switch means for interrupting the flow of current to said electromagnet, retention means for retaining a planar object on the face of said object holder opposite said rear face, said cable being carried upon a pulley and engaged with a counterweight, said pulley being mounted upon a carrier which rides on a rail, said rail being at substantially the top of said frame and in a plane generally parallel to the generally planar surface of the plate.

4. An easel for selectively mounting objects comprising a frame, a plate carried on said frame, said plate being formed of magnetic metal and having a generally planar face, a substantially planar object holder suspended on a cable and carried juxtaposed to the generally planar face of said plate, at least one electromagnet fixedly secured on the rear face of said object holder, said object holder being held juxtaposed to said plate by the magnetic attraction between said electromagnet and said plate, a switch means for interrupting the flow of current to said electromagnet, and retention means for retaining a planar object on the face of said object holder opposite said rear face.

5. A vertical easel for selectively mounting objects comprising an upright frame, a plate carried on said frame, said plate being formed of magnetic metal and having a vertical generally planar face, an object holder dependently suspended on a cable and carried juxtaposed in the generally planar face of said plate, at least one electromagnet fixedly secured on the rear face of said object holder, said object holder being held juxtaposed to said plate by the magnetic attraction between said electromagnet and said plate, a switch means for interrupting the flow of current to said electromagnet, and vacuum retention means for retaining a planar object on the face of said object holder opposite said rear face.

6. An easel in accordance with claim 5, in which the switch means for interrupting the flow of current to the electromagnet on the rear face of the object holder is positioned on the object holder.

7. An easel in accordance with claim 5, in which at least one handle means projects from the side of the object holder.

References Cited in the file of this patent

UNITED STATES PATENTS

| | | |
|---|---|---|
| 999,115 | Le Beau et al. | July 25, 1911 |
| 1,813,690 | Weisker | July 7, 1931 |
| 1,954,753 | Glaser | Apr. 10, 1934 |
| 2,352,221 | Phillips | June 27, 1944 |

FOREIGN PATENTS

| | | |
|---|---|---|
| 113,641 | Great Britain | Feb. 25, 1918 |
| 660,601 | Great Britain | Nov. 7, 1951 |